United States Patent [19]

Opitz

[11] 3,984,608

[45] Oct. 5, 1976

[54] GLASSWARE HAVING IMPROVED RESISTANCE TO ABRASION

[75] Inventor: Herman E. Opitz, Lancaster, Pa.

[73] Assignee: Kerr Glass Manufacturing Corporation, Los Angeles, Calif.

[22] Filed: Apr. 17, 1974

[21] Appl. No.: 461,521

[52] U.S. Cl. ............................ 428/432; 65/60 A; 65/60 B; 65/60 C; 65/60 D; 260/29.6 H; 260/DIG. 31; 427/385 A; 427/419 D; 428/35; 428/523; 427/407 A

[51] Int. Cl.² ............... B32B 17/06; C03C 17/22; C03C 17/32

[58] Field of Search ............... 117/72, 124 E, 94; 215/DIG. 6; 65/60; 260/DIG. 31; 427/385, 407, 419; 428/35, 432, 523

[56] References Cited

UNITED STATES PATENTS

| | | | |
|---|---|---|---|
| 2,953,534 | 9/1960 | Schneider | 260/29.4 UA X |
| 3,264,272 | 8/1966 | Rees | 117/128 X |
| 3,415,673 | 12/1968 | Clock | 117/72 |
| 3,697,467 | 10/1972 | Haughney | 260/29.6 TA |
| 3,799,901 | 3/1974 | McCann et al. | 117/124 E X |
| 3,836,386 | 9/1974 | Roy | 117/124 E X |

*Primary Examiner*—Ralph Husack
*Attorney, Agent, or Firm*—Fitch, Even, Tabin & Luedeka

[57] ABSTRACT

A method is provided for treating ionomeric polymers so as to inhibit the tendency of the polymers to form films. A coating composition including the treated ionomeric polymer is suitable for coating glassware so as to provide glassware having improved resistance to abrasion. The ionomeric polymer coating on the glassware resists film formation when the coating is inadvertently applied to the interior surface of the glassware. The method includes the step of adding colloidal silica to an aqueous dispersion of an ionomeric polymer.

11 Claims, No Drawings

GLASSWARE HAVING IMPROVED RESISTANCE TO ABRASION

The present invention relates generally to coatings for glassware to provide abrasion resistance. More particularly, the present invention relates to improvements in glass coatings wherein ionomeric polymers are used to impart abrasion resistance.

Glassware, particularly glassware intended for use in high speed automatic equipment for filling, sealing, cartoning and the like, is subjected a great deal of abrasion and impact. Such abrasion and impact often result in breakage of the glassware, and such breakage can be very costly in terms of machine downtime. Various means have been utilized to lessen the effect of abrasion and impact on glassware, usually by coating the glassware with some sort of protective agent.

For example, it has been known to coat glassware with a polysiloxane coating. Such polysiloxane coatings impart lubricity to the surface of the glass, thereby decreasing the effect of abrasion and also decreasing breakage due to impact. However, polysiloxane coatings are disadvantageous in that they make it difficult to affix labels to the glassware.

Other polymeric materials have also been used to provide a protective coating on glassware. Polyethylene has been applied to glassware by spraying on an aqueous dispersion of polyethylene. This also provides protection from abrasion and impact.

Another coating system which has been known and used deposits a metal oxide coating on the surface of the glassware, usually a coating of either tin oxide ($SnO_2$) or titanium dioxide ($TiO_2$), also called titania, although other metal oxide coatings are also known to provide desired abrasion resistance, e.g., zirconia and vanadia. Such metal oxide coatings are usually applied at the hot end of the glassware manufacturing operation. After forming and prior to entrance into the annealing lehr the hot glassware is passed through a region in which vapors or a mist of stannic chloride, titanium tetrachloride, or other pyrolyzable tin or titanium compounds are present. A small quantity of vapor or mist is deposited on the surface of the glassware, and as a result of the elevated temperature of the glassware, the pyrolyzable tin or titanium compound is oxidized to provide a coating of either tin oxide or titanium dioxide. The coating is present on the glassware in sufficiently small quantities that it does not result in a visible coating.

It has also been known to utilize combined coatings of a metal oxide and a polymeric coating. In such cases, the metal oxide coating is applied as previously described, and the polymeric coating is applied at the cold end of the lehr. Such combined coatings sometimes result in advantages not provided by the individual coatings.

An improved glass coating comprising an ionomeric polymer is disclosed in U.S. patent application Ser. No. 213,155 of Gerald L. Roy, filed Dec. 28, 1971, now U.S. Pat. No. 3,836,386, the teachings of which are incorporated herein by reference. In general, the ionomeric polymer coating disclosed in the aforesaid patent application comprises a hydrocarbon polymer containing acid groups which are reacted or neutralized to various extents with an ionizable metal. The ionomeric polymer may be applied directly to the surface of the glassware, or it may be applied in combination with a metal oxide coating of the type previously described.

Ionomeric polymers are described in a series of articles published in American Chemical Society Polymer Preprints; Volume 6, No. 1, (April, 1965) pages 287–303, Volume 8, No. 2 (September, 1967) pages 1130–1137, and Volume 9, No. 1, (April, 1968) pages 505–546. The ionomeric polymer described therein is a partially ionized copolymer of ethylene and methacrylic acid. The methacrylic acid component of the ionomeric polymer provides carboxylic groups which are capable of further reaction, and which are particularly suitable for reaction or bonding with the hydroxyl groups of glassware surfaces. The structure of such an ionomeric polymer in which the positive ion is sodium ion may be represented schematically as:

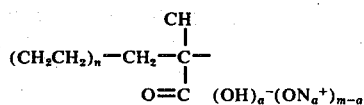

Ionomeric polymers are also described in detail in U.S. Pat. No. 3,264,272, as being a polymer of an alpha-olefin having the general formula $RCH=CH_2$ where R is radical selected from the class consisting of hydrogen and alkyl radicals having from 1 to 8 carbon atoms, the olefin content of said polymer being at least 50 mol percent based on the polymer, and an alpha, beta-ethylenically unsaturated carboxylic acid having 1 or 2 carboxylic acid groups. In accordance with the disclosure of that patent the concentration of acidic monomer in the copolymer is from 0.2 mol percent to 25 mol percent, and preferably from 1 to 10 mol percent. The molecular weight of the copolymer is such as to provide a melt index of 0.1 to 1,000 g. per 10 minutes, and preferably 1 to 100 g. per 10 minutes (ASTM D-1238-57T). At least 10 percent, and preferably between 50 and 80 percent of the acid groups are neutralized or reacted with the metal ion.

Metal ions suitable for forming the ionomeric polymer are listed in the aforementioned United States patent. Suitable monovalent metal ions, as set forth in the aforementioned Rees patent, are $Na^+$, $K^+$, $Li^+$, $Cs^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$. The preferred metal ions are the alkali metal ions, $Na^+$, $K^+$, $Li^+$ and $Cs^+$. The term "ionomeric polymer" as used herein refers to a polymer having one or more of the metal ions set forth in this paragraph.

Ionomeric polymers suitable for the practice of the present invention are available from I. E. du Pont deNemours & Company under the trade designation Elvax D ionomer resin dispersions.

Glassware coated with the ionomeric polymers described above have surprisingly improved resistance to abrasion in comparison to previously known coatings. The preferable method for coating the glassware with the ionomeric polymer is to disperse the ionomeric polymer in water and to spray the resultant dispersion onto the glassware. However, a problem occurs if a substantial quantity of the ionomeric polymer dispersion enters the interior of the glassware. If a substantial amount enters the interior and collects at the bottom of the container, evaporation of water from the dispersion results in concentration of the ionomeric polymer. The ionomeric polymer has strong film-forming properties, and if there is sufficient concentration of the ionomeric polymer the individual particles of the polymer coalesce, providing a film. Upon subsequent filling of glassware containing such a film of ionomeric polymer, the ionomeric polymer may lift off from the interior surface of the glassware. This condition is particularly noticeable when the glassware is filled with a dark, acidic liquid, such as soft drink beverages. The resulting floating film of ionomeric polymer is unsightly and objectionable.

It would be desirable to modify ionomeric polymer dispersions so as to inhibit or prevent the ionomeric polymer from forming films when permitted to concentrate on the interior surface of glassware. Of course, the problem could be prevented by preventing any substantial quantity of ionomeric polymer dispersion from being sprayed onto the interior surface of the glassware. However, without unduly troublesome or complex spraying arrangements, some overspray into the interior of the glassware is inevitable.

Accordingly, it is a principle object of the present invention to provide an improved ionomeric polymer dispersion for coating glassware and other glass articles, and the resultant glassware and glass articles. It is another object of the present invention to provide an improved polymeric coating composition for coating glassware and other glass articles, which polymeric coating composition has a reduced film forming ability. Other objects and advantages of the invention will become apparent from the following detailed description and claims.

Generally, in accordance with various features of the present invention, a method is provided for treating ionomeric polymers so as to inhibit the tendency of the polymers to form films. A coating composition including the treated ionomeric polymer is suitable for coating glassware so as to provide glassware having improved resistance to abrasion. The ionomeric polymer coating on the glassware resists film formation when the coating is inadvertently applied to the interior surface of the glassware. The method includes the step of adding colloidal silica to an aqueous dispersion of an ionomeric polymer. By the term "colloidal silica" is meant silica having a particle size in the colloid range. The upper limit of particle size of the silica is about $0.2 \times 10^{-4}$ cm and the lower limit for the silica particles is about $3 \times 10^{-7}$ cm. In a preferred embodiment of the present invention the colloidal silica is used in the form of a silica sol. A silica sol useful in the practice of the present invention is available from E. I. du Pont de Nemours & Company and is identified by the tradename Ludox AS.

In accordance with the invention, the ionomeric polymer is preferably dispersed in water. Commercially available ionomeric polymers are generally supplied as an aqueous dispersion having from about 10 to about 30 percent polymeric solids in the dispersion. The colloidal silica is added to the dispersion of the ionomeric polymer at a level sufficient to provide from about 0.2 to about 1.2 parts by weight of silica solids per part by weight of polymer solids. Generally, silica sols are commercially available having from about 30 to about 50 percent by weight of colloidal silica dispersed in an aqueous phase. In the practice of the present invention, from about 20 to about 40 parts by volume of such silica sols are combined with from about 60 to about 80 parts by volume of an aqueous ionomeric polymer dispersion having about 20 percent polymer solids.

A particularly preferred ionomeric polymer for use in the present invention is a partially ionized co-polymer of ethylene and methacrylic acid having the following formula:

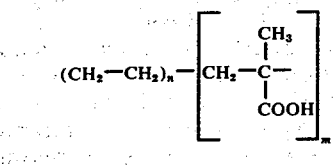

where the ratio of n:m is about 25:1 and the acid groups are partially neutralized with sodium ions.

An ionomeric polymer having the above formula and also having a particle size in the range of from about 0.02 to about 0.04 microns is particularly preferred. If the ionomeric polymer has a particle size higher than this range, colored glassware coated with the ionomeric polymer may have a hazy appearance. However, it should be understood that ionomeric polymers having larger particle sizes are suitable for coating clear glassware and that the haze problem usually occurs only in connection with colored glassware. Ionomeric polymers having a particle size as large as 1 micron may be used.

After the preparation of a treated ionomeric polymer in accordance with the present invention, the aqueous dispersion of ionomeric polymer and colloidal silica is diluted with additional water to provide a sprayable dispersion. Preferably the sprayable dispersion has from about 0.09 to about 0.06 percent by weight of polymer solids and from about 0.02 to about 0.07 percent by weight of colloidal silica. However, sprayable dispersions having higher and lower concentrations of ionomeric polymer and colloidal silica are also useful. The dilute polymeric dispersion may be applied to glassware as it emerges from the cold end of the lehr by spraying the glassware, followed by drying to remove the aqueous carrier. The ionomeric polymer coating may be further treated by heating to about 300°F or higher. However, improved resistance to abrasion is obtained without the heating step.

Preferably, in accordance with the present invention, the treated ionomeric polymer dispersion is applied to glassware which has previously been coated with an inorganic metal oxide coating such as tin oxide or titanium dioxide. Typically, the inorganic metal oxide coating is applied after forming and before the glassware enters the hot end of the lehr. The ionomeric polymer dispersion is applied by spraying the glassware after emerging from the cold end of the lehr so as to deposit the ionomeric polymer on top of the previously deposited inorganic metal oxide coating.

The ionomeric polymer concentration in the aqueous dispersion which is sprayed onto the glassware is sufficiently low that the ionomeric polymer is distributed on the surface of the glassware in the form of discrete particles rather than as a continuous film covering the entire glassware surface. Some overspray usually occurs and some of the ionomeric polymer is applied to the interior surface of the glassware. The presence of the colloidal silica prevents the discrete particles of ionomeric polymers from forming a film on the interior of the glassware.

Moreover, glassware coated in accordance with the present invention has surprisingly improved resistance to abrasion in comparison with previously known coatings. Scratch resistance of the glassware is equal to or better than the scratch resistance of glassware coated with prior art coatings even though the ionomeric polymer coating of the present invention may be applied from aqueous dispersions containing only half the concentration of polymer used in the prior art dispersions, such as a polyethylene dispersion. Glassware coated in accordance with the present invention retains its resistance to abrasion even after exposure to autoclave conditions and when exposed to alkaline treatment. Removal torque of closures from glassware coated in accordance with the present invention is also substantially improved over the prior art coatings. Label adhesion to the coated glassware is satisfactory.

EXAMPLE I

As an example of the present invention, various ionomeric polymer coatings were prepared. The ionomeric polymer was an interpolymer of ethylene and methacrylic acid with part of the acid group having been reacted or neutralized with an alkali metal. The polymer is commercially available from E. I. duPont de Nemours & Company under the trade designation Elvax D-1263. The ionomeric polymer as supplied contained 20 percent by weight polymer solids. The ionomeric polymer was treated in accordance with the invention by adding a silica sol to the polymer. The silica sol contained 30 percent colloidal silica solids and is commercially available from E. I. duPont de Nemours & Company under the trade designation Ludox AS. The silica sol was added to the ionomeric polymer dispersion and blending was effected by mixing under conditions of mild agitation. Thereafter, the mixture of the ionomeric polymer and silica sol was diluted to provide an aqueous dispersion in which the ionomeric polymer was present at a level of 0.07 percent by weight.

Various coating compositions were made by the above described method. Microscope slides were then dipped into each of the coating compositions. The microscope slides were then dried and immersed in a test liquid to observe the effect on the coating.

Visual examination after several days immersion was then made and the results in respect to the various coating compositions was as follows:

| COATING COMPOSITION | TEST LIQUID SEVEN-UP | TEST LIQUID COCA-COLA |
| --- | --- | --- |
| Ionomeric polymer (with no colloidal silica) | objectionable films and threads form | objectionable films and threads form |
| Ionomeric polymer with 10 percent by volume silica sol | small floaters form | small floaters form |
| Ionomeric polymer with 20 percent by volume silica sol | no objectionable films | no objectionable films |
| Ionomeric polymer with 30 percent by volume silica sol | no objectionable films | no objectionable films |
| Ionomeric polymer with 40 percent by volume silica sol | no objectionable films | no objectionable films |

Various other features of the present invention are set forth in the following claims.

What is claimed is:

1. Glassware having improved resistance to abrasion comprising a metal oxide coating on the glassware and the residue after drying of an aqueous dispersion of an ionomeric polymer and colloidal silica deposited over the metal oxide coating, said ionomeric polymer comprising a polymer of an alpha-olefin and an alpha, beta-ethylenically unsaturated carboxylic acid, the olefin content of said polymer being at least 50 mol percent based on the polymer and the content of the ethylenically unsaturated carboxylic acid monomer being from 0.2 mol percent to 25 mol percent based on the polymer, between about 10 and about 80 percent of the carboxylic acid groups being neutralized with an ionizable metal, said colloidal silica content of said aqueous dispersion being sufficient to provide from about 0.2 to about 1.2 parts by weight of silica solids per part by weight of polymer.

2. Glassware in accordance with claim 1 where said ionomeric polymer of said composition comprises an interpolymer of ethylene and methacrylic acid.

3. Glassware in accordance with claim 1 wherein said colloidal silica of said composition has a particle size in the range of from about $3 \times 10^{-7}$ cm and about $0.2 \times 10^{-4}$ cm.

4. Glassware in accordance with claim 1 wherein said metal oxide coating is tin oxide.

5. Glassware in accordance with claim 1 wherein said metal oxide coating is titanium dioxide.

6. A method for providing a protective coating for glassware to provide improved resistance to abrasion and a reduced tendency for film forming comprising, in combination, the steps of forming glassware, providing a metal oxide coating on said glassware, depositing on the glassware an aqueous dispersion of an ionomeric polymer and colloidal silica, and thereafter removing said aqueous carrier by drying, said ionomeric polymer comprising a polymer of an alpha-olefin and an alpha beta-ethylenically unsaturated carboxylic acid, the olefin content of said polymer being at least 50 mol percent based on the polymer and the content of the ethylenically unsaturated carboxylic acid monomer being from 0.2 mol percent to 25 mol percent based on the polymer, between about 10 and about 80 percent of the carboxylic acid groups being neutralized with an ionizable metal, said colloidal silica content of said aqueous dispersion being sufficient to provide from about 0.2 to about 1.2 parts by weight of silica solids per part by weight of polymer.

7. A method in accordance with claim 6 wherein said ionomeric polymer comprises an interpolymer of ethylene and methacrylic acid.

8. A method in accordance with claim 6 wherein said colloidal silica has a particle size in the range of from about $3 \times 10^{-7}$ cm and about $0.2 \times 10^{-4}$ cm.

9. A method in accordance with claim 6 in which the metal oxide coating comprises tin oxide.

10. A method in accordance with claim 6 in which the metal oxide coating comprises titanium dioxide.

11. A method in accordance with claim 6 wherein the ionomeric polymer content of said aqueous dispersion is from about 0.06 to about 0.09 percent by weight.

* * * * *